US012688328B2

(12) United States Patent
Casale et al.

(10) Patent No.: US 12,688,328 B2
(45) Date of Patent: Jul. 21, 2026

(54) DECENTRALIZED PLATFORM AND ARCHITECTURE

(71) Applicant: Quotient Partners, LLC, Greenwich, CT (US)

(72) Inventors: Francis Casale, Greenwich, CT (US); Charles C. Fry, Austin, TX (US); Eric Polerecky, Howell, MI (US); Jehiel Martinez, San Pedro Sula (HN)

(73) Assignee: Quotient Partners, LLC, Greenwich, CT (US)

( * ) Notice: Subject to any disclaimer, the term of this patent is extended or adjusted under 35 U.S.C. 154(b) by 183 days.

(21) Appl. No.: 18/705,828

(22) PCT Filed: Dec. 23, 2022

(86) PCT No.: PCT/US2022/053921
§ 371 (c)(1),
(2) Date: Apr. 29, 2024

(87) PCT Pub. No.: WO2023/122323
PCT Pub. Date: Jun. 29, 2023

(65) Prior Publication Data
US 2024/0427929 A1 Dec. 26, 2024

Related U.S. Application Data

(60) Provisional application No. 63/293,499, filed on Dec. 23, 2021.

(51) Int. Cl.
G06F 21/62 (2013.01)
G06F 21/60 (2013.01)

(52) U.S. Cl.
CPC ........ G06F 21/6245 (2013.01); G06F 21/602 (2013.01)

(58) Field of Classification Search
CPC .......................... G06F 21/602; G06F 21/6245
(Continued)

(56) References Cited

U.S. PATENT DOCUMENTS

| | | | |
|---|---|---|---|
| 12,081,558 B2 * | 9/2024 | Moon ................... | H04L 63/068 |
| 2012/0136936 A1 | 5/2012 | Quintuna | |

(Continued)

FOREIGN PATENT DOCUMENTS

| | | |
|---|---|---|
| TW | 201905813 A | 2/2019 |
| TW | 202143136 A | 11/2021 |

OTHER PUBLICATIONS

NPL Search Terms (Year: 2025).*

(Continued)

*Primary Examiner* — Syed A Zaidi
(74) *Attorney, Agent, or Firm* — Volpe Koenig

(57) ABSTRACT

A method is provided. The method is implemented by an engine to provide private and autonomous control of digital information and services of a user. The engine is executed by a processor within a decentralized platform. The engine, by implementing the method, generates a cryptographically secure and reusable distributed identity for the user and stores the digital information and services on behalf of the user within the decentralized platform. The engine also enables independent, anonymous, and secure management of the digital information and services via the cryptographically secure and reusable distributed identity. The independent, anonymous, and secure management provides direct and private control over the digital information and services to the user. The independent, anonymous, and secure management includes assigning user categories to other digital identities to control access the digital information and services.

20 Claims, 8 Drawing Sheets

(58) Field of Classification Search
USPC ........................................................ 726/4, 17
See application file for complete search history.

(56) References Cited

U.S. PATENT DOCUMENTS

| | | | |
|---|---|---|---|
| 2014/0115715 A1* | 4/2014 | Pasdar .................... | G06F 21/85 |
| | | | 726/26 |
| 2017/0046526 A1 | 2/2017 | Chan et al. | |
| 2017/0046689 A1* | 2/2017 | Lohe .................... | G06Q 20/384 |
| 2017/0046806 A1* | 2/2017 | Haldenby ............. | G06Q 40/08 |
| 2017/0193464 A1 | 7/2017 | Sher | |
| 2017/0337387 A1* | 11/2017 | Scafaria ............. | G06F 21/6245 |
| 2018/0323963 A1 | 11/2018 | Stollman | |
| 2018/0343126 A1 | 11/2018 | Fallah et al. | |
| 2019/0207756 A1* | 7/2019 | Vass ...................... | H04L 9/0863 |
| 2020/0044848 A1 | 2/2020 | Chari et al. | |
| 2020/0349653 A1* | 11/2020 | Grube ................ | G06Q 20/3825 |
| 2021/0211287 A1* | 7/2021 | Roy ...................... | H04L 9/3236 |
| 2023/0185957 A1* | 6/2023 | Brown ............... | G06F 21/6245 |
| | | | 726/26 |
| 2025/0272427 A1* | 8/2025 | Ahuja ................. | G06F 21/6245 |

OTHER PUBLICATIONS

NPL Search Terms (Year: 2026).*

Decision of Rejection received in TW Application No. 111149770, mailed Apr. 3, 2024, with English translation (8 pages).

International Search Report and Written Opinion received in International Application No. PCTUS202259321, mailed Mar. 27, 2023 (6 pages).

1 Notice of Allowance received in TW Application No. 202143136, dated Oct. 29, 2024 (6 pages).

* cited by examiner

400

500

DECENTRALIZED PLATFORM AND ARCHITECTURE

BENEFIT CLAIM AND INCORPORATION BY REFERENCE

This application is a national stage entry of International Application No. PCT/US2022/053921, filed Dec. 23, 2022, which claims priority to provisional U.S. Application No. 63/293,499, filed Dec. 23, 2021, the contents of each of which are hereby incorporated by reference in their entirety.

FIELD OF INVENTION

The present invention is related to a decentralized platform and architecture.

BACKGROUND

Conventionally, digital information and computing are limited to a conventional central server architecture (e.g., whether using a client-server model or using personal devices) managed and controlled by a third-party central authority. More particular, the third-party central authority (e.g., centralized, privately controlled service providers) is able to access, read, and censor the digital information created and provided by users, as well as manipulation and control of user identities and corresponding user behavior. In turn, the third-party central authority can manipulate, censor, aggregate, control, and monetize this digital information. Users want control of their digital information. There are presently no architectures that can provide a decentralized mechanism for sharing digital information, thereby enabling such user control.

SUMMARY

A method is provided. The method is implemented by an engine to provide private and autonomous control of digital information and services of a user. The engine is executed by at least one processor within a decentralized platform. The engine, by implementing the method, generates a cryptographically secure and reusable distributed identity (DID) for the user and stores the digital information and services on behalf of the user within the decentralized platform. The engine also enables independent, anonymous, and secure management of the digital information and services via the cryptographically secure and reusable DID. The independent, anonymous, and secure management provides direct and private control over the digital information and services to the user. The independent, anonymous, and secure management includes assigning one of a plurality of user categories to other DIDs to control access the digital information and services. The method can be implemented by a computer program product, an apparatus, a system, or a decentralized platform according to one or more embodiments.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Disclosed herein is a decentralized platform. The decentralized platform can support at least private and autonomous social media activity through secure, private, personal data and computing provisions.

According to one or more embodiments, the secure, private, personal data and computing provisions are a processor executable code or software that is necessarily rooted in process operations by, and in processing hardware of, the decentralized platform. For ease of explanation, an engine is described herein with respect to these secure, private, personal data and computing provisions. One or more advantages, technical effects, and/or benefits of the engine can include privatizing data storage and user behavior to eliminate a need for third-party central authority management. In this regard, the engine and the decentralized platform provide autonomy for the users, security and privacy of data, and ability to act without coercion, each of which eliminates any coercive influence over users by third-party central authorities. Further, due to the privatizing of data storage and user behavior by the engine, as well as security and privacy of the decentralized platform, users can create, distribute, and consume their digital information and services within the decentralized platform free from any third-party central authority control and manipulation. Thus, the engine particularly utilizes and transforms the decentralized platform to enable/implement private and autonomous social media activity that otherwise is not currently available with the conventional central server architecture.

Figure 1:
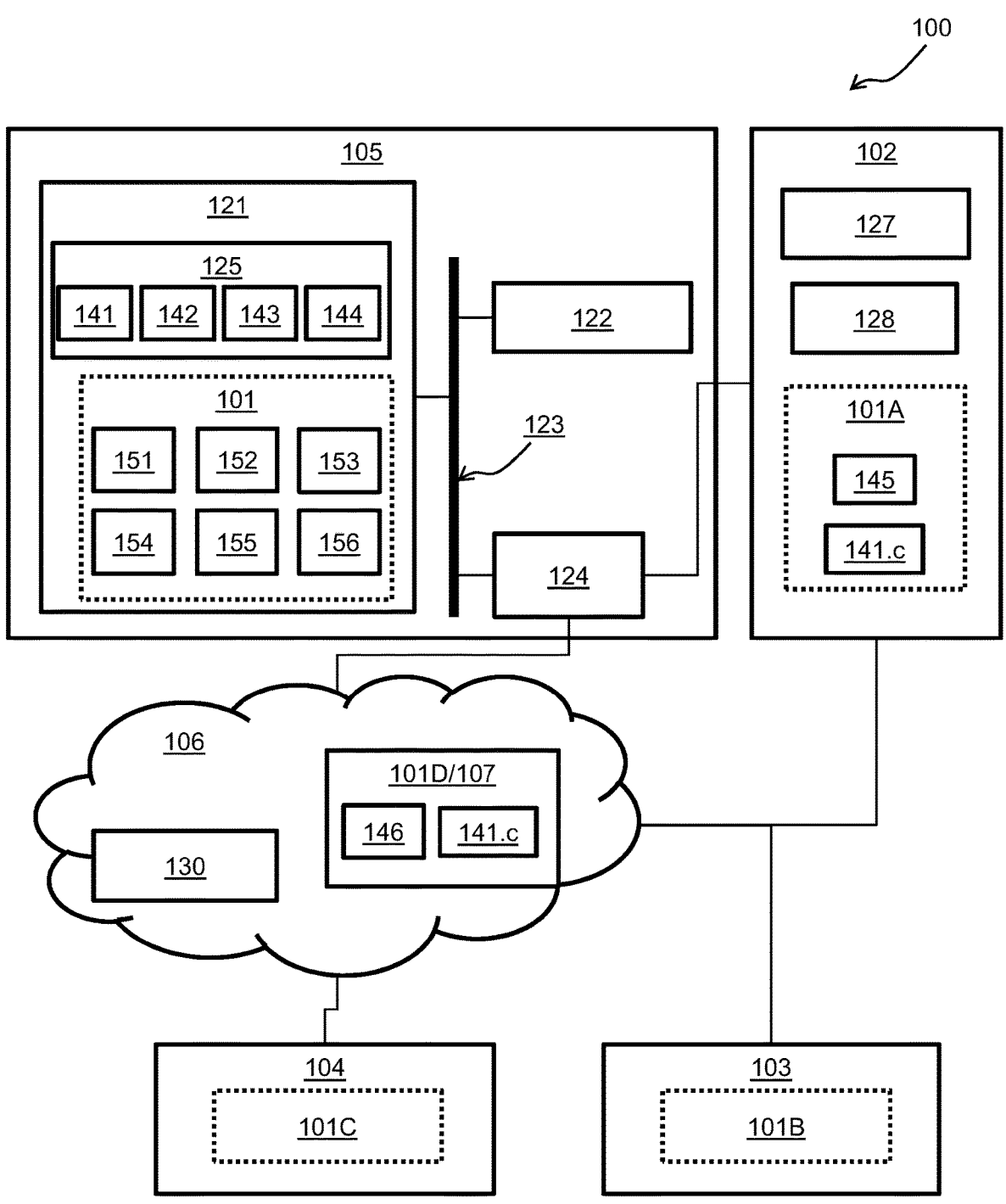
FIG. 1 depicts a diagram of an architecture according to one or more embodiments.

FIG. 1 illustrates a diagram of an architecture 100 (also referred to as a decentralized platform) according to one or more embodiments. Generally, the architecture 100 provides a node based decentralized platform that implements local data retention. While single elements are shown in FIG. 1, these single elements are representative of a plurality of that element. The architecture 100 includes an engine 101, a device 102, computing platforms 103 and 104, a server 105, a network 106, and a service 107, each of which can represent a node within the architecture 100.

The engine 101 can be hardware, software, or a combination thereof. As shown, the engine 101 can be software that operates within the server 105. Generally, the engine 101 can be stored on a memory (e.g., a system memory 121) as software components, modules, instructions, or the like for execution by a processor (e.g., a processor 122). According to one or more embodiments, the engine 101 can be software (e.g., an application) implemented through one or more different instances 101A, 101B, 101C, and 101D. Therefore, the engine 101 is detailed as a dashed-box 101A to illustrate a scalability and a portability of the engine 101 within the architecture 100 (e.g., the engine 101 can be implemented through one or more different instances 101, 101A, 101B, 101C, and 101D, which can further communicate therebetween). As an example, the engine 101 can be implemented as the service 107, which provides at least public aspects of a blockchain of the architecture 100. The blockchain of the architecture 100 can guarantee fidelity and security for the architecture 100, for the local data retention, and for user/device/server/node identities, as well as generate trust between nodes without a need for a third-party central authority.

According to one or more embodiments, the engine 101 implements a practical use of the blockchain of the architecture 100 to enable social networking (i.e., sharing pictures, stories, messaging, etc.). More particularly, the engine 101A executing in the device 102, the engine 101 executing the server 105, and the service 107 uniquely employ public and private key pairs to cryptographically secure identities for users/devices/servers/nodes and to regulate authorization of logins of the users/devices/servers/nodes. For example, each instance 101, 101A, 101B, 101C, and 101D of the engine 101 enables peer to peer connections within the architecture 100, such as by using the blockchain of the architecture 100, to create and provide social media experience without the conventional central server architecture. More particularly, to form the architecture 100 (e.g., the decentralized platform), a first instance 101 can be on the server 105 (e.g., a server instance of the private server), a second instance 101A can be on the device 102 (e.g., a mobile instance or terminal application on a mobile phone), a third instance 101D can be on the network 106 (e.g., the service 107), and the first, second, and third instances 101, 101A, and 101D can act together to create and provide the social media experience (e.g., a three-part contribution process). Operations of the engine 101 are further described herein.

The device 102, the computing platforms 103 and 104, and the server 105 can be any combination of software and/or hardware that individually or collectively store, execute, and implement the engine 101 and functions thereof. Further, the device 102, the computing platforms 103 and 104, and the server 105 can each be a node (e.g., communication endpoint) of an electronic, computer framework (e.g., the decentralized platform shown as the architecture 100) including and/or employing any number and combination of computing device and networks utilizing various communication technologies, as described herein. The device 102, the computing platforms 103 and 104, and the server 105 can be easily scalable, extensible, and modular, with the ability to change to different services or reconfigure some features independently of others. Examples of the device 102, the computing platforms 103 and 104, and the server 105 can include, but are not limited to, a stationary/standalone device, a base station, a desktop/laptop computer, a smart phone, a smartwatch, a tablet, or other device configured to communicate across the network 106. Accordingly, the device 102, the computing platforms 103 and 104, and the server 105 can be programed to execute computer instructions with respect the engine 101.

As an example, the server 105 includes the system memory 121 and the processor 122 connected via a system bus 123, which also connects an adapter 124. Generally, the system memory 121 can be any non-transitory tangible media, such as magnetic, optical, or electronic memory (e.g., any suitable volatile and/or non-volatile memory, such as random-access memory or a hard disk drive). The system memory 121 stores the computer instructions for execution by the processor 122. The processor 122 can be any central processing unit, graphical processing unit, microprocessor, field-programmable array, or the like capable of executing the computer instructions. The system bus 123 enables internal communications between the system memory 121, the processor 122, and the adapter 124. The adapter 124 can include a separate transmitter, a separate receiver, and/or an integrated transmitter/receiver to enable external communications from the server 105 through the network 106 and/or directly to the device 102. The system memory 121 can include/store a repository 125 and/or software (e.g., the engine 101). The repository 125 can be database (e.g., an SQL database) and/or another storage mechanism. The system memory 121, the processor 122, and the system bus 123 are representative of elements of the device 102 and the computing platforms 103 and 104, though not repeated therein for efficiency and brevity.

As an example, the device 102 can include a control device 127 and a display 128 (or other input/output elements. The control device 127, such as a computer mouse, a keyboard, a touchpad, a touch screen, a keypad, or the like, may be further coupled to the device 102 for input (e.g., one or more inputs may be provided by a user. The display 128 is configured to provide one or more UIs or GUIs that can be generated and provided by the engine 101, as the users interacts with the device 205. Examples of the display 241 can include, but are not limited to, a plasma, a liquid crystal display (LCD), a light emitting diode (LED), a field emission display (FED), an organic light emitting diode (OLED) display, a flexible OLED display, a flexible substrate display, a projection display, a 4K display, a high definition (HD) display, a Retina© display, an in-plane switching (IPS) display or the like. The display 128 may be configured as a touch, three dimensional (3D) touch, multi-input touch, or multi-touch display using resistive, capacitive, surface-acoustic wave (SAW) capacitive, infrared, optical imaging, dispersive signal technology, acoustic pulse recognition, frustrated total internal reflection, or the like as understood by one of ordinary skill in the art for input/output (I/O). The control device 127 and the display 128 are representative of elements of the computing platforms 103 and 104 and the server 105, though not repeated therein for efficiency and brevity.

The network 106 can be a wired network, a wireless network, or include one or more wired and wireless networks. According to an embodiment, the network 106 can be a short-range network (e.g., local area network (LAN), or personal area network (PAN)). Information can be sent, via the network 106, between the device 102, the computing platforms 103 and 104, and the server 105 using any one of various short-range wireless communication protocols, such as Bluetooth, Wi-Fi, Zigbee, Z-Wave, near field communications (NFC), ultra-band, Zigbee, or infrared (IR). According to an embodiment, the network 106 can be one or more of an Intranet, a local area network (LAN), a wide area network (WAN), a metropolitan area network (MAN), a direct connection or series of connections, a cellular telephone network, or any other network or medium capable of facilitating communication between the device 102, the computing platforms 103 and 104, and the server 105. Information can be sent, via the network 106, using any one of various long-range wireless communication protocols (e.g., TCP/IP, HTTP, 3G, 4G/LTE, or 5G/New Radio). Note that, for the network 106, wired connections can be implemented using Ethernet, Universal Serial Bus (USB), RJ-11 or any other wired connection and wireless connections can be implemented using Wi-Fi, WiMAX, and Bluetooth, infrared, cellular networks, satellite or any other wireless connection methodology.

The network 106 can include one or more additional nodes 130, as well as the service 107. Each node 130 of the network 106 contributes as a communication endpoint to the decentralized platform provided by the architecture 100. The service 107 can be particular type of node 130 that provides anchor operations and support, but not control, to the decentralized platform provided by the architecture 100. For instance, the service 107 can support part of the blockchain of the architecture 100. Generally, a blockchain is a distributed database for maintaining a secure and decentralized record of transactions and shared among the nodes 130, the service 107, the device 102, the computing platforms 103 and 104, and the server 105 of the architecture 100.

According to one or more embodiments, the architecture 100 includes distributed identity (DID) management. The DID management enables users to create DIDs, which are cryptographically secure and reusable DIDs. The DID management enables the created DIDs to be associated with the blockchain of the architecture 100. That is, each DID can independently, anonymously, and securing manage all digital information and services for a particular user/device/server/node. For example, the server 105 and the engine 101 work in cooperation with the service 107 in the blockchain to provide the DID management. The DID management can enable obfuscate an identity of the server 105 to support private and autonomous social media activity within the architecture 100, as well as other secure, private, personal data and computing provisions of the engine 101. The DID management can enable obfuscate an identity of the user to support private and autonomous social media activity within the decentralized platform.

Each DID can include a public-private key combination (i.e., a public key and a private key). A public key can be a cryptography element available for anyone to use for encrypting and/or signing data. Copies of the public key can be shared on other parts of the architecture 100, such as with the blockchain of the service 107. A private key can be a cryptography element available for individual use for encrypting and/or signing data. For example, data encrypted with the public key can only be decrypted with the private key. As shown in FIG. 1, the DID of the server 105 enables the engine 101 to store keys 141, 141, 143, and 144 within the repository 125. Additional keys 145 and 146 can be present within the architecture 100.

According to one or more embodiments, the server 105 is implemented as a physical server of the architecture 100 (i.e., a decentralized platform). For example, the server 105 can be a private server, such as physical unit purchased and managed locally by a user. As another example, the server 105 and operations thereof can be implemented/contained in another unit (i.e., or extendable beyond any private server), such as in a jump drive, etc.

By way of example, a user/customer purchases the server 105 (i.e., a private server) that, when brought online, creates and includes a DID with the public key 141 and the private key 142 for the server 105 and a DID with the public key 143 and the private key 144 for the user/customer. The user/customer uses the device 102 (i.e., a mobile phone) to download the second instance 101A of the engine 101 (i.e., a terminal application) to configure the server 105. Configuring the server 105 includes enabling the user to name (create a username) for the server 105, which in turn is used for the DID of the server 105. The user/customer sees only the username on the display 128 when viewing the server 105. In the background, the terminal application with the server 105 creates the associations for that user/customer to have exclusive control of the server 105. Public data (e.g., a copy 141.*c* of the public key 141) is stored in the blockchain, and the terminal application receives a copy 142.*c* of the private key 142 for the DID of the server. Further, if the user/customer desires to share access to the server 105, the user/customer can send an invite that seamlessly and in the background shares a copy 141.*c* of the public key 141. In turn, the user/customer may never know that they are using blockchain and public-private key mechanism.

According to one or more embodiments, the architecture 100 can include a private cloud. In turn, the server 105 can be virtualized, as well, in the private cloud. The engine 101 implements the decentralized platform (i.e., the architecture 100), such as by configuring the server 105 (e.g., the private server or a software-based private server) and/or the private cloud.

With respect to operations of the engine 101, by way of example, the system memory 121 of the server 105 stores instructions of the engine 101 for execution by the processor 122. Generally, upon execution of the instructions of the engine 101, the server 105 can locally privatize data storage and user behavior to eliminate a need for third-party central authority management or third-party data storage (e.g., thereby enable users to create, distribute, and consume their digital information and services within the architecture 100). More particularly, the repository 125 can locally store digital information and services, models, neural networks, machine learning, artificial intelligence, automations, documents, entities, confidence metrics, images, segments, hashes, video, frames, source data, source code, etc., for access by the engine 101. The engine 101 can then utilize the models, the neural networks, the machine learning, the artificial intelligence, etc. to locally create, distribute, and consume the digital information and services. Thus, the engine 101 can provide or be part of a framework/mechanism that automatically implements a decentralized server approach (i.e., the architecture 100).

By further example, the scope and operation of the engine 101 can be described with respect to a social media experience that containerizes and shares digital information and services in a decentralized manner, utilizing a software-based private server (i.e., the server 105). The engine 101 can be implemented/contained on a variety of commuting platforms, including Internet of Things (IoT) devices, dedicated local hardware, and mobile devices, as well as virtualized version in one or more cloud computing providers. In this regard, the engine 101 through its operations implement the decentralized platform to support private and autonomous social media activity (e.g., the digital information and services) through secure, private, personal data and computing provisions. Operations 151, 152, 153, 154, 155, and 156 represent examples of such secure, private, personal data and computing provisions, though the engine 101 is not limited thereto.

Figure 2:
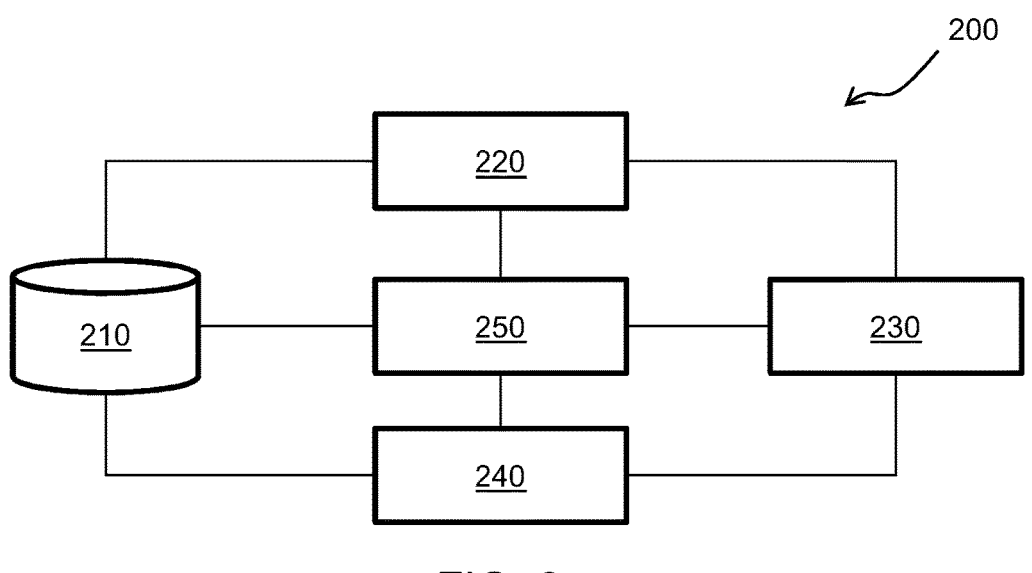
FIG. 2 depicts a diagram of a system according to one or more embodiments.
Figure 3:
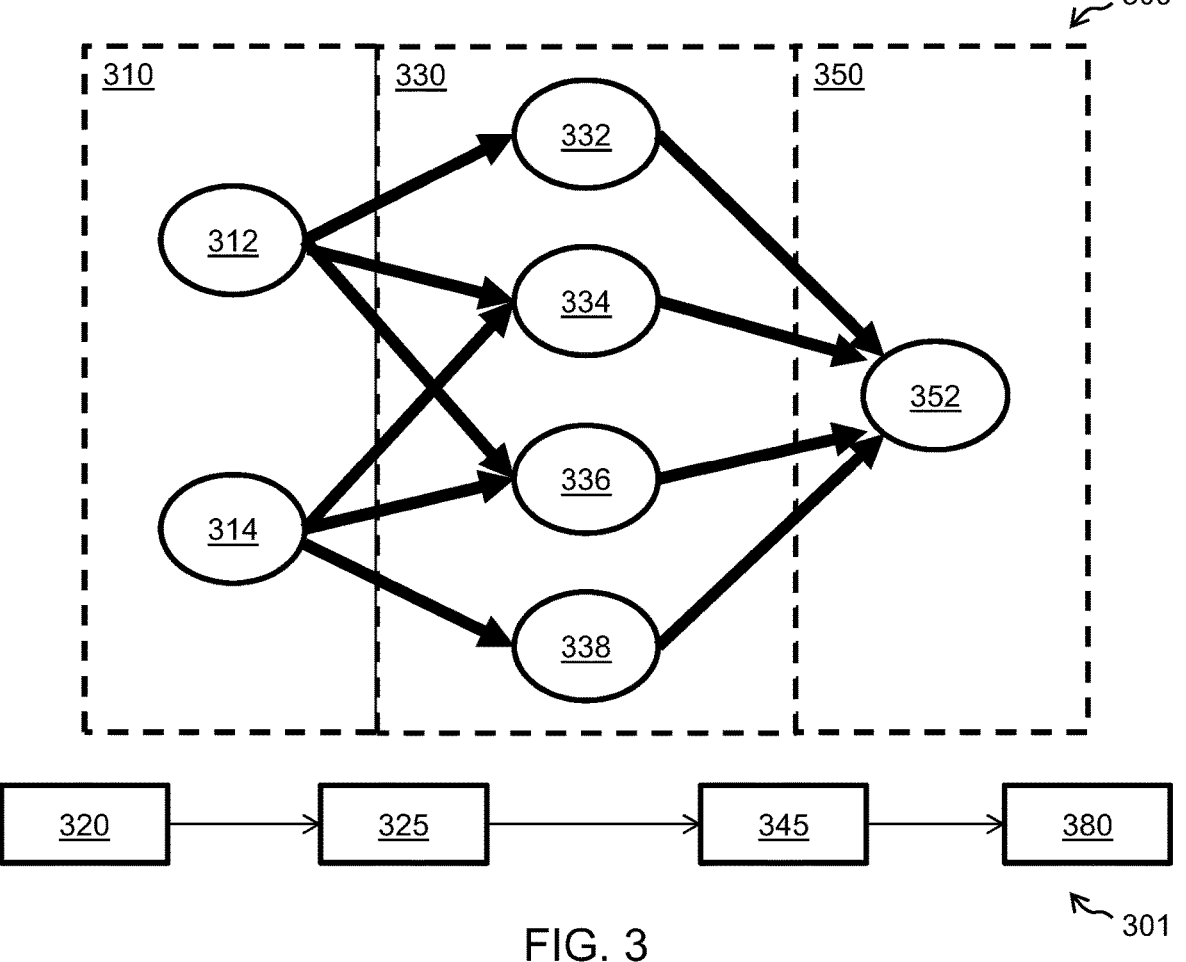
FIG. 3 depicts diagrams of a system and a method performed in the neural network according to one or more embodiments.

Regarding operation 151, the engine 101 can enable a user (e.g., owner of the server 105) control of the social media experience by providing machine learning and/or an artificial intelligence (ML/AI). The ML/AI of the engine 101 can provide the social media experience, such as automatic suggestions of nodes 130, repositories 125, and connections. The ML/AI of the engine 101 can provide the social media experience by automatically organizing the digital information, providing notifications to other users, and encrypting user interactions/communications. The ML/AI of the engine 101 can provide the social media experience by designing personalized interactions, eliciting emotion based on the digital information and connections, and driving stronger and deeper relationships within the connections. The ML/AI of the engine 101 can provide the social media experience by automatically setting permissions. FIGS. 2-3 describe ML/AI with respect to the engine 101.

FIG. 2 illustrates a diagram of a system 200 according to one or more embodiments. The system 200 includes data 210 (e.g., the digital information and services), a machine 220, a model 230, an outcome 240, and (underlying) hardware 250. FIG. 3 illustrates diagrams of a system 300 (e.g., a neural network) and a method 301 performed in the system 300 are shown according to one or more embodiments. The system 300 operates to support implementation of the ML/AI algorithms described herein (e.g., as implemented by the engine 101). The system 300 can be implemented in hardware, such as the machine 220 and/or the hardware 250 of FIG. 2. The description of FIGS. 2-3 is made with reference to other FIGS. for ease of understanding where appropriate. For example, the machine 210 and the model 230 can represent aspects of the engine 101 of FIG. 1 (e.g., ML/AI algorithm therein), while the hardware 250 can also represent the server 105 of FIG. 1.

In general, the ML/AI algorithms of the system 200 (e.g., as implemented by the engine 101 of FIG. 1) operate with respect to the hardware 250, using the data 210, to train the machine 220, build the model 230, and predict the outcomes 240. For instance, the machine 220 operates as the controller or data collection associated with the hardware 250 and/or is associated therewith. The data 210 can be on-going data or output data associated with the hardware 250. The data 210 can also include currently collected data, historical data, or other data from the hardware 250 and can be related to the hardware 250. The data 210 can be divided by the machine 220 into one or more subsets. Further, the machine 220 trains, such as with respect to the hardware 250. This training can also include an analysis and correlation of the data 210 collected. In accordance with another embodiment, training the machine 220 can include self-training by the engine 101 of FIG. 1 utilizing the one or more subsets. Moreover, the model 230 is built on the data 210 associated with the hardware 250. Building the model 230 can include physical hardware or software modeling, algorithmic modeling, and/or the like that seeks to represent the data 210 (or subsets thereof) that has been collected and trained. In some aspects, building of the model 230 is part of self-training operations by the machine 220. The model 230 can be configured to model the operation of hardware 250 and model the data 210 collected from the hardware 250 to predict the outcome 240 achieved by the hardware 250. Predicting the outcomes 240 (of the model 230 associated with the hardware 250) can utilize a trained model 230. Thus, using the outcome 240 that is predicted, the machine 220, the model 230, and the hardware 250 can be configured accordingly.

Thus, for the system 200 to operate with respect to the hardware 250, using the data 210, to train the machine 220, build the model 230, and predict the outcomes 240, the ML/AI algorithms therein can include neural networks. In general, a neural network is a network or circuit of neurons, or in a modern sense, an artificial neural network (ANN), composed of artificial neurons or nodes or cells. For example, an ANN involves a network of processing elements (artificial neurons) which can exhibit complex global behavior, determined by the connections between the processing elements and element parameters. In more practical terms, neural networks are non-linear statistical data modeling or decision-making tools that can be used to model complex relationships between inputs and outputs or to find patterns in data. Thus, ANNs may be used for predictive modeling and adaptive control applications, while being trained via a dataset. Note that self-learning resulting from experience can occur within ANNs, which can derive conclusions from a complex and seemingly unrelated set of information. The utility of artificial neural network models lies in the fact that they can be used to infer a function from observations and also to use it. According to one or more embodiments, the neural network can implement a deep neural network, a long short-term memory neural network architecture, a convolutional neural network (CNN) architecture, or other the like. The neural network can be configurable with respect to a number of layers, a number of connections (e.g., encoder/decoder connections), a regularization technique (e.g., dropout); and an optimization feature.

In an example operation, the engine 101 of FIG. 1 includes collecting the data 210 from the hardware 250. In the system 300, an input layer 310 is represented by a plurality of inputs (e.g., inputs 312 and 314 of FIG. 3). With respect to block 320 of the method 301, the input layer 310 receives the inputs 312 and 314. The inputs 312 and 314 can include the digital information and services or other date of the repository 125. At block 325 of the method 301, the system 300 encodes the inputs 312 and 314 utilizing any portion of the data 210 (e.g., the dataset and predictions produced by the system 200) to produce a latent representation or data coding. The latent representation includes one or more intermediary data representations derived from the plurality of inputs. According to one or more embodiments, the latent representation is generated by an element-wise activation function (e.g., a sigmoid function or a rectified linear unit) of the engine 101 of FIG. 1. As shown in FIG. 3, the inputs 312 and 314 are provided to a hidden layer 330 depicted as including nodes 332, 334, 336, and 338. The system 300 performs the processing via the hidden layer 330 of the nodes 332, 334, 336, and 338 to exhibit complex global behavior, determined by the connections between the processing elements and element parameters. Thus, the transition between layers 310 and 330 can be considered an encoder stage that takes the inputs 312 and 314 and transfers it to a deep neural network (within layer 330) to learn some smaller representation of the input (e.g., a resulting the latent representation). This encoding provides a dimensionality reduction of the inputs 312 and 314. Dimensionality reduction is a process of reducing the number of random variables (of the inputs 312 and 314) under consideration by obtaining a set of principal variables. For instance, dimensionality reduction can be a feature extraction that transforms data (e.g., the inputs 312 and 314) from a high-dimensional space (e.g., more than 10 dimensions) to a lower-dimensional space (e.g., 2-3 dimensions). The technical effects and benefits of dimensionality reduction include reducing time and storage space requirements for the data 210, improving visualization of the data 210, and improving parameter interpretation for machine learning. This data transformation can be linear or nonlinear. The operations of receiving (block 320) and encoding (block 325) can be considered a data preparation portion of the multi-step data manipulation by the engine 101. At block 345 of the method 310, the system 300 decodes the latent representation. The decoding stage takes the encoder output (e.g., the resulting the latent representation) and attempts to reconstruct some form of the inputs 312 and 314 using another deep neural network. In this regard, the nodes 332, 334, 336, and 338 are combined to produce in the output layer 350 an output 352, as shown in block 360 of the method 310. That is, the output layer 390 reconstructs the inputs 312 and 314 on a reduced dimension but without the interferences, artifacts, and noise.

Regarding operation 152, the engine 101 can provide the social media experience through different platforms/modes/options for computing and/or storage, such as a stationary/standalone device, a base station, a desktop/laptop computer, a smart phone, a smartwatch, a tablet, a jump drive, or other device. In this regard, the social media experience includes one or more interfaces (e.g., user interfaces or UI) that provide user friendly interactions with the engine 101.

Regarding operation 153, the engine 101 can enable a user (e.g., owner of the server 105) control of the social media experience by providing configuration control over digital information and services. Examples of configuration control over digital information and services include setting permissions. The permissions can include configurations for access and sharing of pictures and stories. The permissions can include configurations for messaging, partitioning aspects of the social networking by invitation, etc. One or more advantages, technical effects, and/or benefits of this configuration control of the engine 101 can include providing private data sharing to only authorized users who are able to access the digital information and services.

Regarding operation 154, the engine 101 can enable a user (e.g., owner of the physical server) control of the social media experience by providing configuration control for inviting and managing one or more guests who are permitted to see and comment on the digital information and services provided by the user. One or more advantages, technical effects, and/or benefits of this configuration control of the engine 101 can include providing secure, private group communication with users. According to one or more embodiments, the engine 101 can include user categories, such as owner, member, and guest, each of which can have configurable roles and permissions respective to a particular social media experience. According to one or more embodiments, managing guests can include accepting, blocking, and/or deleting other users from accessing the server 105. For example, a member or a guest can have access to digital information and services of an owner by invitation only.

Regarding operation 155, the engine 101 can enable a user (e.g., owner of the physical server) control of the social media experience by providing a cryptographic wallet experience. One or more advantages, technical effects, and/or benefits of the one or more cryptographic wallets of the engine 101 can include private financial transactions independent from any third-party central authority.

Regarding operation 156, the engine 101 can be extendable and connectable to third-party software, such as in support of or in operation with an application store or marketplace.

Figures 4, 5:
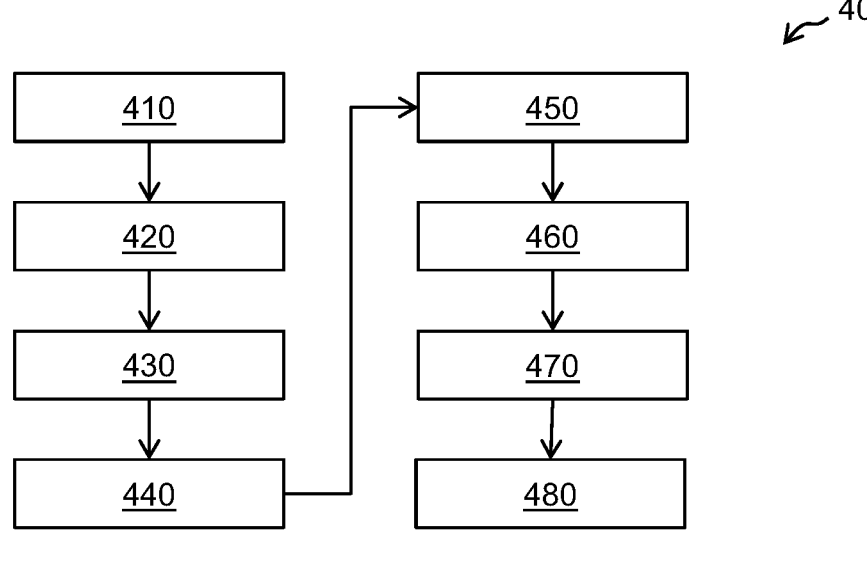
FIG. 4 depicts a method according to one or more embodiments.
FIG. 5 depicts a method according to one or more embodiments.

Turning now to FIG. 4, a method 400 (e.g., performed by the engine 101 of FIG. 1 in view of operations 151, 152, 153,

154, 155, and 156) is depicted according to one or more embodiments. The method 400, as implemented by the engine 101, provide private and autonomous control of digital information and services of a user. Thus, the method 400 addresses a need to eliminate third-party central authority management by providing a multi-step manipulation of the digital information and services that enables direct user control of the digital information and services. Note that the method 400 can be implemented by the engine 101 executed by at least one processor 122 within the architecture 100.

The method 400 begins at block 410, where the engine 101 onboards a user. Onboarding the user can include actions for turning on the server 105 and creating a DID for the user (i.e., implementing direct and easy on-boarding from a user perspective). For instance, the engine 101A presents an interface (e.g., a UI) through the device 104 that indicates the engine 101A is looking for the server 101. Once the server 105 is powered on and connected to the device 104, the engine 101A presents an interface (e.g., a UI) through the device 104 to receive one or more user inputs. Based on the one or more user inputs, the engine 101A generates a cryptographically secure and reusable DID for the user of the server 105. Alternatively, the engine 101A can forward the one or more user inputs to the engine 101, which generates a cryptographically secure and reusable DID for the user of the server 105.

By way of example, FIG. 5 depicts a method 500 according to one or more embodiments. The method 500 is an example of creating the DID. The method 500 begins at block 510, where the engine 101A receives a username and a password through an interface (e.g., a UI).

According to one or more embodiments, the engine 101A provides options via a UI for the user creating the DID to configure a username, such as determining letter characteristics (e.g., lowercase vs. capital), special characters, alphanumeric values, string length, and exclusions, to assist in obfuscating identity and providing anonymity for the social media experience. A technical effect of obfuscating the identity of the server 105 includes support of private and autonomous social media activity within the architecture 100. The private and autonomous social media activity includes social interaction without third party control of the digital information or services.

According to one or more embodiments, the engine 101A provides options via a UI for the user creating the DID to configure a password to assist in securing the social media experience. According to one or more embodiments, the cryptographically secure and reusable DID can be associated with the password upon creation, as well as the public-private key combination. Further, the cryptographically secure and reusable DID can be associated with the blockchain of the architecture 100. A technical effect of associating the cryptographically secure and reusable DID with the blockchain, the public-private key combination, and/or the password includes guaranteeing fidelity and security for the architecture 100, for the local data retention, and for user/device/server/node identities, as well as providing trust between nodes 130 without a need for a third-party central authority. Further, another technical effect of associating the cryptographically secure and reusable DID with the blockchain, the public-private key combination, and/or the password is enabling the device 104 to communicate within the architecture 100 using the blockchain, and the keys stored thereon.

At block 520, the engine 101A generates a seed. The seed can be a recovery phrase, a word, a series of words, a series of characters, or the like generated by the engine 101A to provide access to the server 105 associated with the created cryptographically secure and reusable DID.

At block 530, the engine 101A generates a second DID with the seed for the user. The engine 101A provides options via a UI for the user creating the second DID to configure a username, such as determining letter characteristics (e.g., lowercase vs. capital), special characters, alphanumeric values, string length, and exclusions, to assist in obfuscating identity of the user and providing anonymity for the social media experience. A technical effect of obfuscating the identity of the user includes support private and autonomous social media activity within the architecture 100. The private and autonomous social media activity includes social interaction without third party control of the digital information or services.

At block 540, the engine 101A generates one or more profiles. The one or more profiles can be saved within the corresponding DID or the second DID. The one or more profiles can be a collection of settings and information associated with the server 105 or the user, such as critical information used to identify either. The settings and information can include usernames, portrait photograph, individual characteristics, keys, address information, passwords, preferences, and ages.

At block 550, the engine 101A encrypts the seed with the password. Encrypting the seed can occur before storing an encrypted seed on the repository 125 to provide additional security. The engine 101A can utilize encryption algorithms or software therein to encrypts the seed with the password, such as by using a password with a cipher to obscure the seed into a ciphertext or the encrypted seed. At block 560, the engine 101A saves the profiles, the DIDs, the keys, and the encrypted seeds in local storage. At block 570, the engine 101A returns or communicates the profiles, the DIDs, the keys, and the encrypted seeds to the engine 101.

Figure 6A:
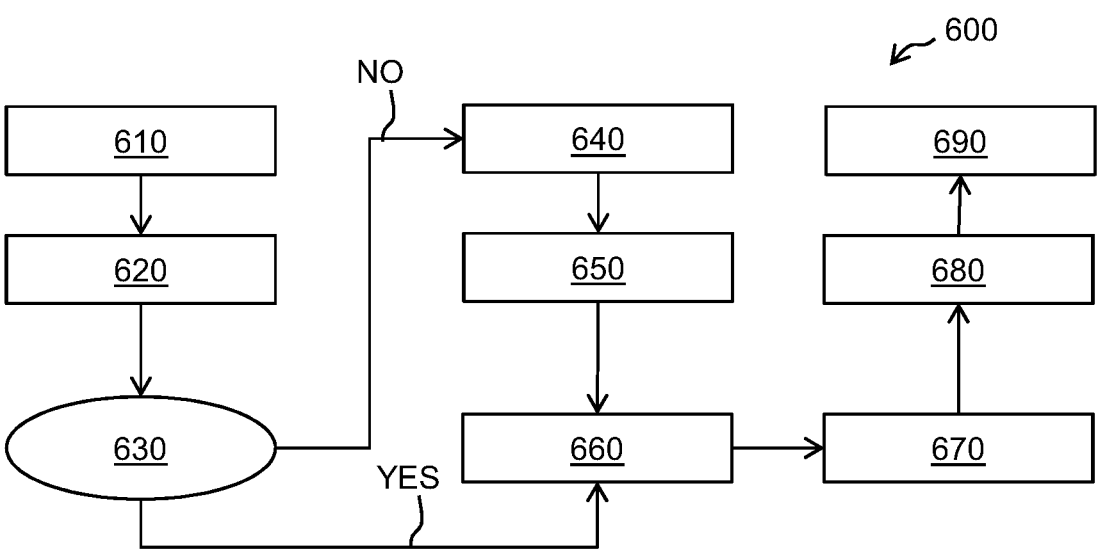
FIG. 6A depicts a method according to one or more embodiments.
Figure 6B:
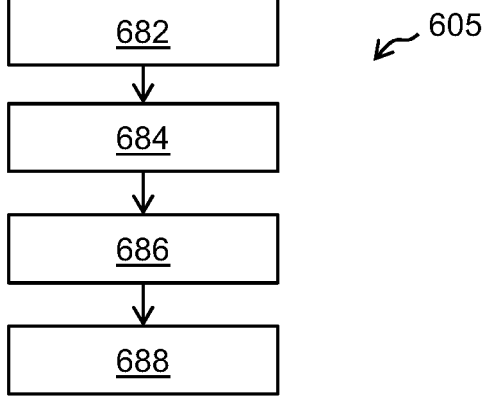
FIG. 6B depicts a method according to one or more embodiments.

At block 420, the engine 101 enables login and logout operations. The login and logout operations provide opportunity for the user to access the server 105 via the interfaces (e.g., a UIs) of the engine 101A. By way of example, FIGS. 6A-6B depicts methods 601 and 605 according to one or more embodiments. The method 601 is an example of a user login, and the method 605 is an example of a user logout.

The method 601 begins at block 610, where the engine 101A generates a UI. At block 620, where a username and a password are received via the UI by the engine 101A. At decision block 630, the engine 101A checks for an encrypted seed in local storage of the device 104. According to one or more embodiments, the engine 101A utilizes the received username and password to determine whether there is a corresponding encrypted seed (e.g., from blocks 550 and 560). If there is no encrypted seed in local storage, the process proceeds (NO arrow) to block 640.

At block 640, the engine 101A prompting for a user input via the device 104. The user input can be received from a direct input or a scan, such as a scan of a quick-response (QR) code. Information of the user input can include the encrypted seed. At block 650, the engine 101A receives the user input. Within the user input is the encrypted seed. At block 660, the engine 101A decrypts the encrypted seed with the password from block 620. Returning to block 630, if there is an encrypted seed in local storage, the process proceeds (YES arrow) to block 660.

At block 670, the engine 101A logs-in the user with decrypted seed. Logging-in includes a combination of authorization and authentication for the user by examining the decrypted seed, the username, and the password. At block 680, the engine 101A saves the profile, the DID, the keys and the encrypted seed in local storage. The local storage can be a memory of the server 105. At block 690, the engine 101A returns profile, DID, keys and encrypted seed to the device 104. In this regard, all digital information and services by the engines 101 and 101A include secure, private, personal data and computing provisions (with respect to the user) that enable the direct and private control over the digital information and services associated with the decrypted seed, the username, and the password. Direct and private control includes a sovereignty (i.e., absolute sovereignty) over the digital information and services to an exclusion of one or more of the other DIDs or to an exclusion of one or more third-parties.

The method 605 begins at block 682, where the engine 101A receives a user input. The user input being received through a UI of the engine 101A and indicating a log-out. At block 684, the engine 101 stores the encrypted seed in local storage. Note that the private and autonomous social media activity that has occurred can be saved in the server 105 and/or stored on the blockchain as needed to guarantee fidelity. No other user, who is not invited or is a guest of the user can access the private and autonomous social media activity. At block 686, the engine 101A deletes remaining information. The engine 101A can delete non-saved information. At block 688, the engine 101A returning the UI to a log-in prompt (i.e., an authentication interface).

Figure 7:
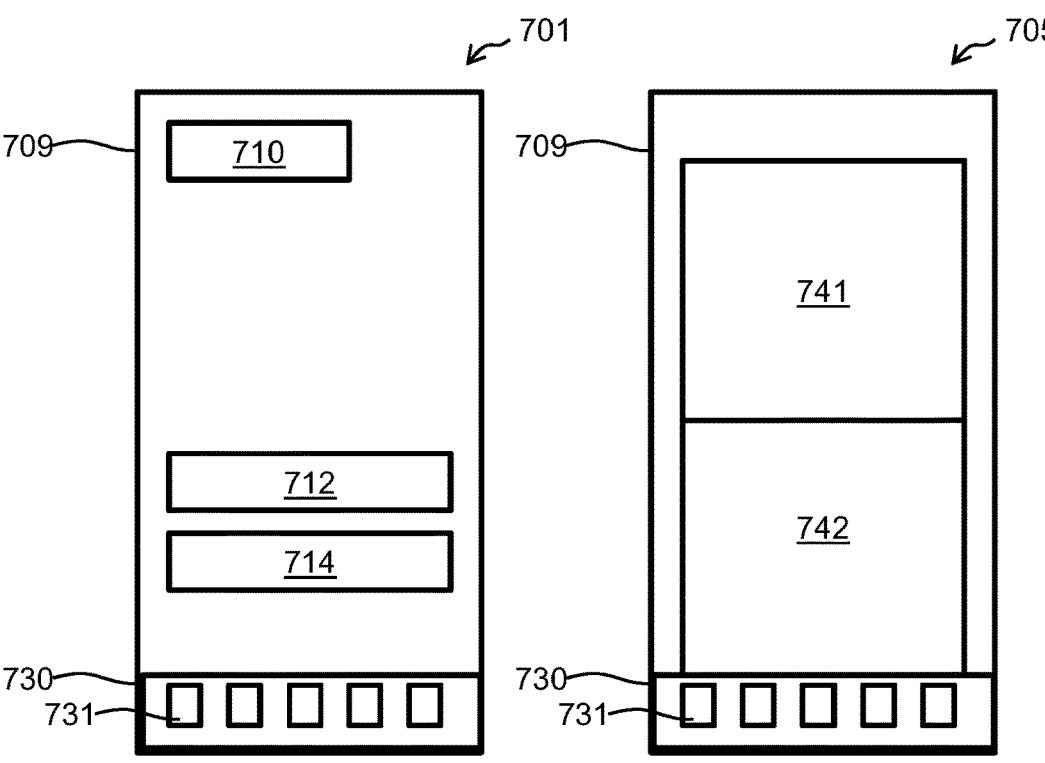
FIG. 7 depicts interfaces according to one or more embodiments.

Returning to block 430, the engine 101 generates a feed. The feed provides the digital information and services. Note that the engine 101 and the cryptographically secure and reusable DID continue to obfuscate the identity of the user to support private and autonomous social media activity within the architecture 100. FIG. 7 depicts interfaces 701 and 705 (e.g., UIs) with respect to the feed according to one or more embodiments.

The interface 701 includes a frame 709 for presenting text, graphics, and other digital information and services to the user of the device 104. The frame 709 includes a title bar 710 that can present a name or other identifying elements for the content of the frame. By way of example, the interface 701 presents a feed of the user, which is empty in the case of interface 701. The frame 709 can indicate that "Your feed is empty" with a graphic, as well as one of more interface elements 712 and 714. The interface element 712 can include a 'create a post' element that enables the user to add digital information and services to the feed. The interface element 714 can include an 'invite friends' element that enables the user to assign categories to other DIDs and/or invite new users to create a DID. The interface 701 also includes a frame 730 that can act as a toolbar with one or more shortcut interface elements that manipulate the content of the frame 709. By way of example, a shortcut interface 731 upon selection can display the feed. Further, interface 705 presents sub-frames 741 and 742, each of which can includes post as created by the user of the feed. For instance, the sub-frames 741 and 742 can include, but are not limited to, display of the DID, a graphic, a photo, a video, a timestamp, and a comment area.

Figure 8:
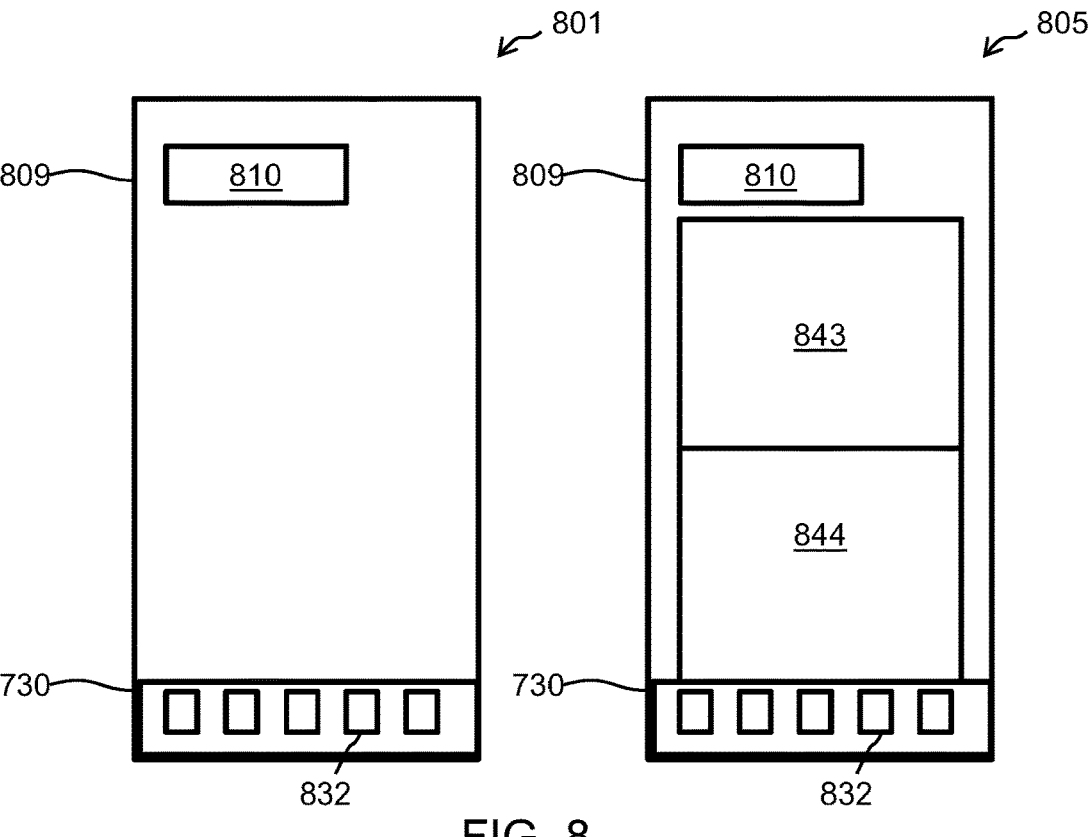
FIG. 8 depicts interfaces according to one or more embodiments.

At block 440, the engine 101 generates a notifications. Notifications can include, but are not limited to, pop-up windows or prompts, drop-down menus or prompts, text message notifications, email notifications, bubble indicators, numerical indicators, and flags. FIG. 8 depicts interfaces 801 and 805 (e.g., UIs) with respect to the notifications according to one or more embodiments.

The interface 801 includes a frame 809 for presenting text, graphics, and other digital information and services to the user of the device 104. The frame 809 includes a title bar 810 that can present a name or other identifying elements for the content of the frame. By way of example, the interface 801 presents a notifications of the user, which is empty in the case of interface 801. The frame 809 can indicate that "Your notifications are empty" with a graphic. The interface 801 also includes the frame 730. By way of example, a shortcut interface 832 upon selection can display the notifications. Further, interface 805 presents sub-frames 843 and 844, each of which can includes notifications of other post created by other users. For instance, the sub-frames 843 and 844 can include, but are not limited to, display of the DID, a message, a graphic, a photo, a video, a timestamp, and a comment area ordered according to the timestamp. The sub-frame 843 can include notifications from 'today', while the sub-frame 844 can include notifications from 'yesterday'.

Figure 9:
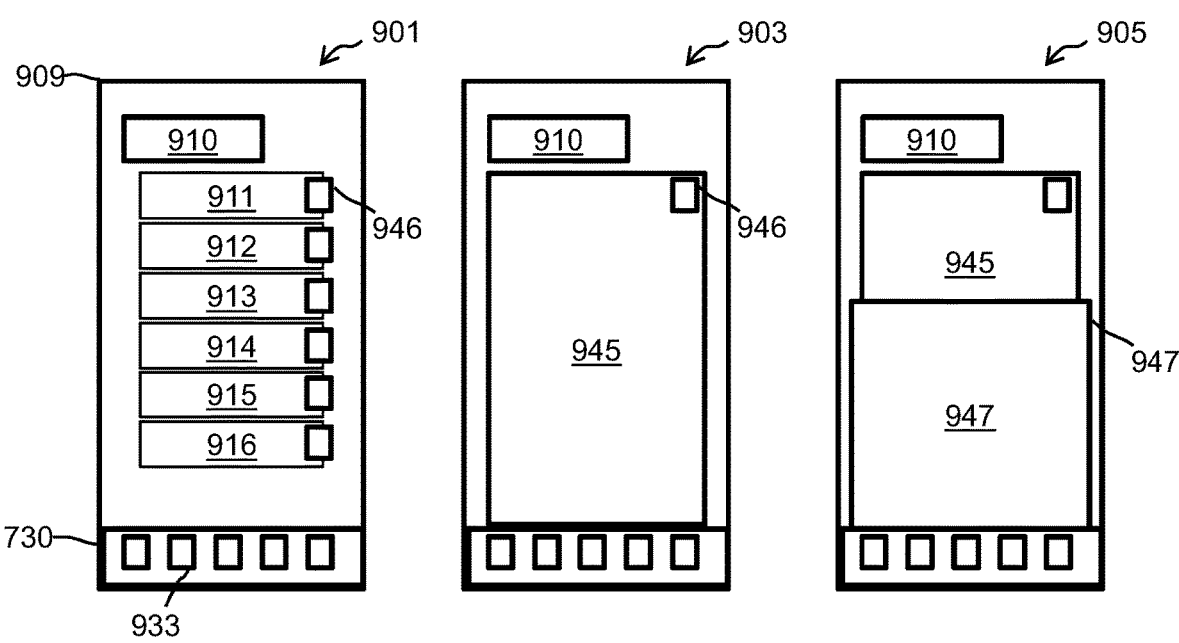
FIG. 9 depicts interfaces according to one or more embodiments.
Figure 9:
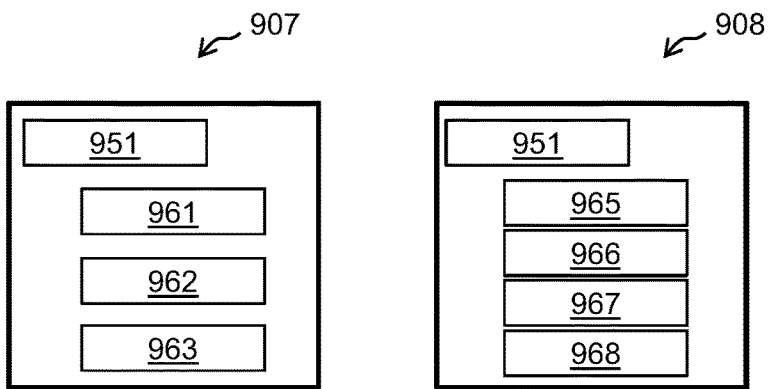

At block 450, the engine 101 provides messaging. Messaging can include communications between users. For instance, because the cryptographically secure and reusable DID include at least a DID associated with a blockchain, messages associated therewith can also utilize the blockchain. These messages are censorship-resistant and fully transparent between the users. FIG. 9 depicts interfaces 901, 903, 905, 907, and 908 (e.g., UIs) according to one or more embodiments.

The interface 901 includes a frame 909 for presenting text, graphics, and other digital information and services to the user of the device 104. The frame 909 includes a title bar 910 that can present a name or other identifying elements for the content of the frame. By way of example, the interface 901 presents messages for the user, which is empty in the case of interface 901. The frame 909 can indicate a plurality of users 911, 912, 913, 914, 915, 915, etc., each of which is selectable to show messages between the user of the device 104 and other users. The interface 901 also includes the frame 730. By way of example, a shortcut interface 933 upon selection can display the plurality of users 911, 912, 913, 914, 915, 915. Further, upon selection of any of the plurality of users 911, 912, 913, 914, 915, 915, an interface 901 can present a sub-frame that shows messages between the user of the device 104 and the selected user. For example, interface 903 presents a sub-frame 945 that shows messages between the user of the device 104 and the selected user. Furthermore, an interface element 946 enables further configurations with respect to an associated user. That is, upon selection, the interface element 946 enables a display the sub-frame 497, which can display the interfaces 907 and 908. The interfaces 907 and 908 show options 951. The options 951 can include, but are not limited to, report 961, block 962, delete 963, new broadcast 965, invite a friend 966, new contact 967, and new conversation 668. The options are action examples of how the engines 101 and 101A maintain the sovereignty (i.e., absolute sovereignty) over the digital information and services and provide private and autonomous social media activity.

Figure 10:
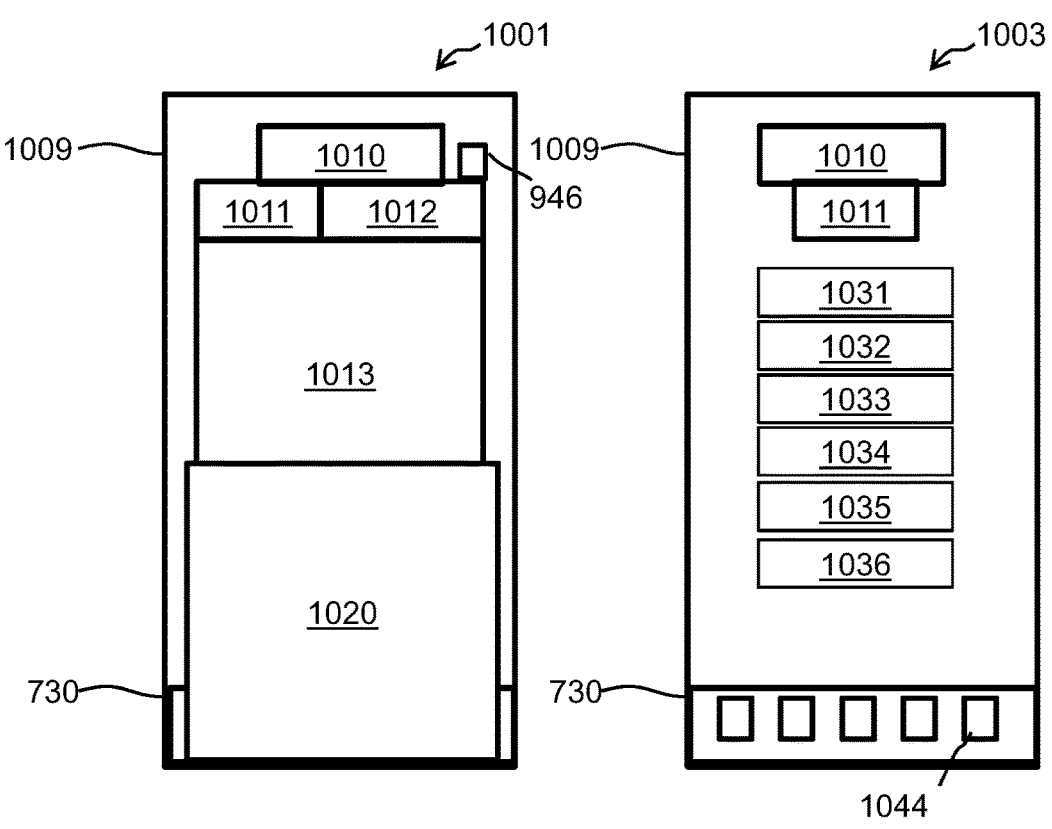
FIG. 10 depicts interfaces according to one or more embodiments.
Figure 10:
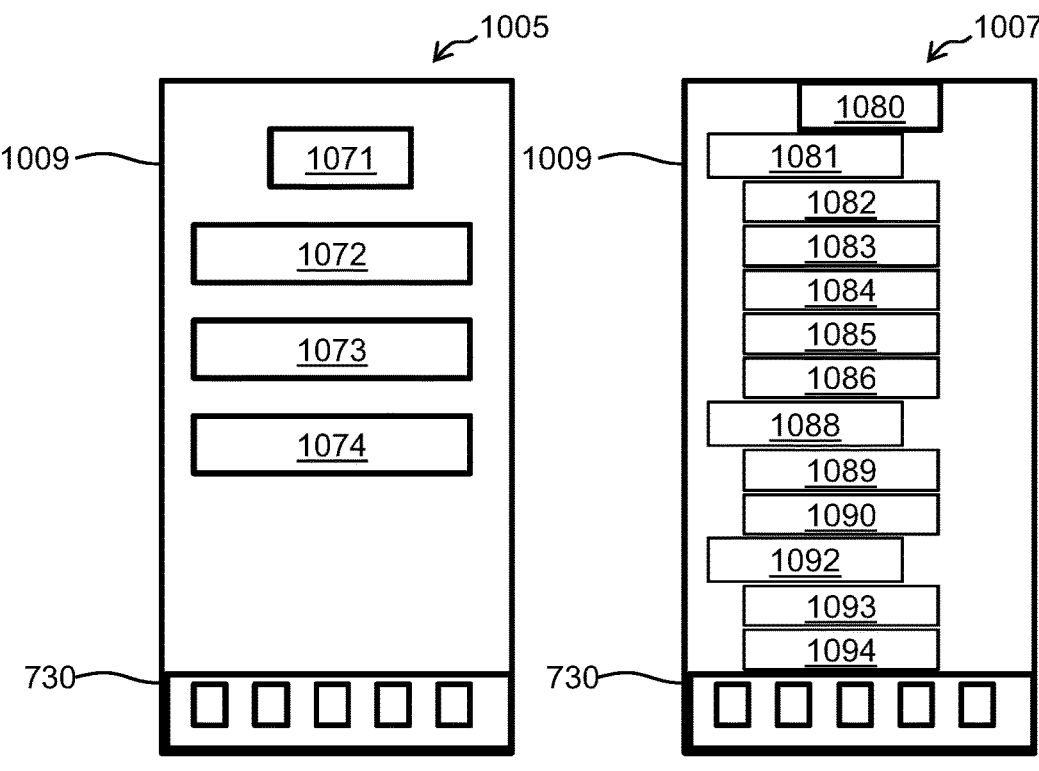

At block 460, the engine 101 generates digital information and services. Generates digital information and services can include creating a post. The post are outward messages attached to a user's feed viewable to specific users as authorized by the user. Thus, the digital information and services include posting in a private and a secure manner. According to one or more embodiments, as the digital information and services is generated, the engines 101 and 101A store the digital information and services on behalf of the user within the architecture 100 (e.g., via local storage and blockchain storage). In turn, via the cryptographically secure and reusable DID (i.e., through the login and logout operations), the engines 101 and 101A enables anonymous, and secure management of the digital information and services. The independent, anonymous, and secure management by the engines 101 and 101A includes, but are not limited to, direct and private control to the user over the digital information and services. Direct and private control includes a sovereignty (i.e., absolute sovereignty) over the digital information and services to an exclusion of one or more of the other digital identities or to an exclusion of one or more third-parties, such as editing, deleting, adding, updating, sharing, hiding, and the like without input or rule from other digital identities or third-parties. FIG. 10 depicts interfaces 1001, 1003, 1005, and 1007 (e.g., UIs) according to one or more embodiments.

The interface 1001 includes a frame 1009 for presenting text, graphics, and other digital information and services to the user of the device 104. The frame 1009 present a name or other identifying elements. By way of example, the interface 1009 presents a profile of the user, which includes a title bar 1010 showing the DID, a graphic 1011 showing an images or the like and an actual name, and a listing of values 1012 regarding a user following number, a user followed number, and a post number. By way of example, the interface 1009 presents a profile of the user, which includes a title bar 1010 showing the DID, a graphic 1011 showing an images or the like and an actual name, and a listing of values 1012 regarding a user following number, a user followed number, and a post number. The sub-frame 1013 can further show images, posts, videos, and other digital information and services associated with the profile of the user. The interface element 946 is also present in the frame 1009 and upon selection provides the sub-frame 1020. The sub-frame 1020 can present options, such as settings, privacy, security, account, and log out. The options of the sub-frame 1020 are action examples of how the engines 101 and 101A maintain the sovereignty (i.e., absolute sovereignty) over the digital information and services and provide private and autonomous social media activity.

By way of example, the interface 1003 includes a frame 1009 for presenting the profile of the user of the device 104. The profile can include, but is not limited to, name 1031 (e.g., fanciful name), username 1032 (e.g., username of the DID), save changes 1033, account settings 1034, access/privacy settings 1035, and personal settings 1035. The interface 1009 also includes the frame 730. By way of example, a shortcut interface 1044 upon selection can display the profile of the user of the device 104.

Upon selection of the personal settings 1035, the interface 1005 can be presented. The interface 1005 includes a frame 1009 for presenting text, graphics, and other digital information and services for the personal information of the user, all of which are configurable. By way of example, the frame 1009 presents a title bar 1071 (i.e., 'Personal Information'), an email 1072, a birthday 1073, and a save changes 1074.

Upon selection of the account settings 1034, the interface 1007 can be presented. The interface 1008 includes a frame 1009 for presenting text, graphics, and other digital information and services for the setting of the user, all of which are configurable. By way of example, the frame 1009 presents a title bar 1080 (i.e., 'Setting') and account header 1081 (i.e., 'Account'). Under the account header 1081, the frame 1009 presents selectable elements for 'follow and invite friends 1082, about 1083, add account 1084, manage tags 1085, and logout 1086. The frame 1009 presents general header 1088 (i.e., 'General'), under which is shown selectable elements for push notifications 1089 and language 1090. The frame 1009 presents support header 1092 (i.e., 'Support'), under which is shown selectable elements for report a problem 1093 and help center 1094.

Figure 11:
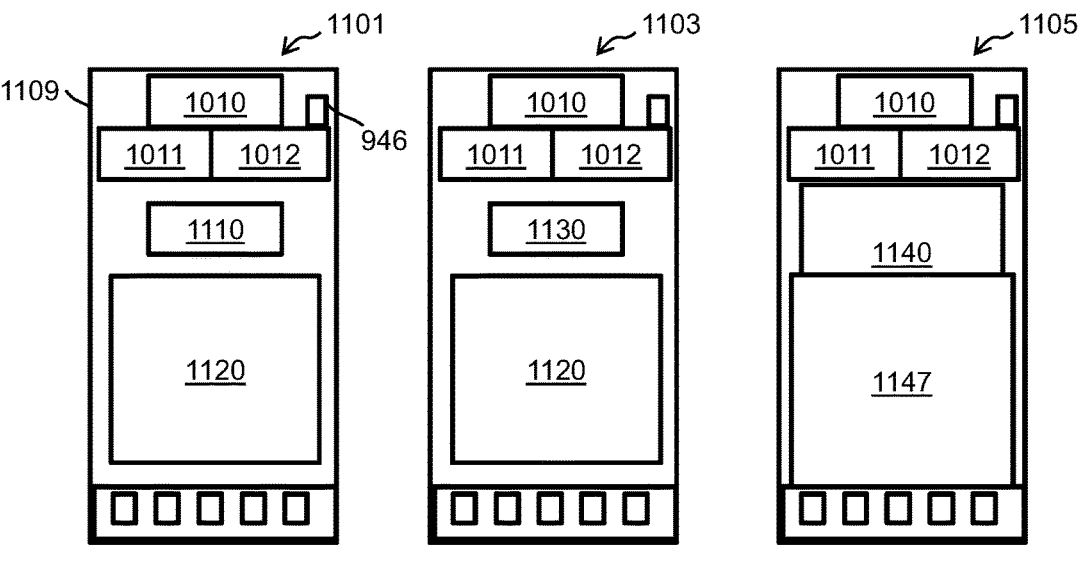
FIG. 11 depicts interfaces according to one or more embodiments.

At block 470, the engine 101 provides a profile view. The profile view can be an interface that presents elements, settings, and the like associated with the cryptographically secure and reusable DID to the user. FIG. 11 depicts interfaces 1101, 1103, and 1105 (e.g., UIs) according to one or more embodiments.

The interface 1101 includes a frame 1109 for presenting text, graphics, and other digital information and services of user unassociated with the user of the device 104. The frame 1109 additionally includes a selectable element 1110 and a sub-frame 1120. The selectable element 1110 enables the user of the device 104 to poke or notify that unassociated user. The sub-frame 1120 shows a graphic and/or a message indicating that the unassociated user profile is locked. The interface 1103 includes an element 1130, that indicates a request to associate has been sent. In turn, the unassociated user can assign a category to the user of the device 104. Once associated, the interface 1105 includes a sub-frame 1140 that presents the digital information and services of the now associated user, with an collapsible options menu 1047 that enables the user of the report, block, unfollow, and remove follower. The options of the interfaces 1101, 1103, and 1105 are action examples of how the engines 101 and 101A maintain the sovereignty (i.e., absolute sovereignty) over the digital information and services and provide private and autonomous social media activity.

Figure 12:
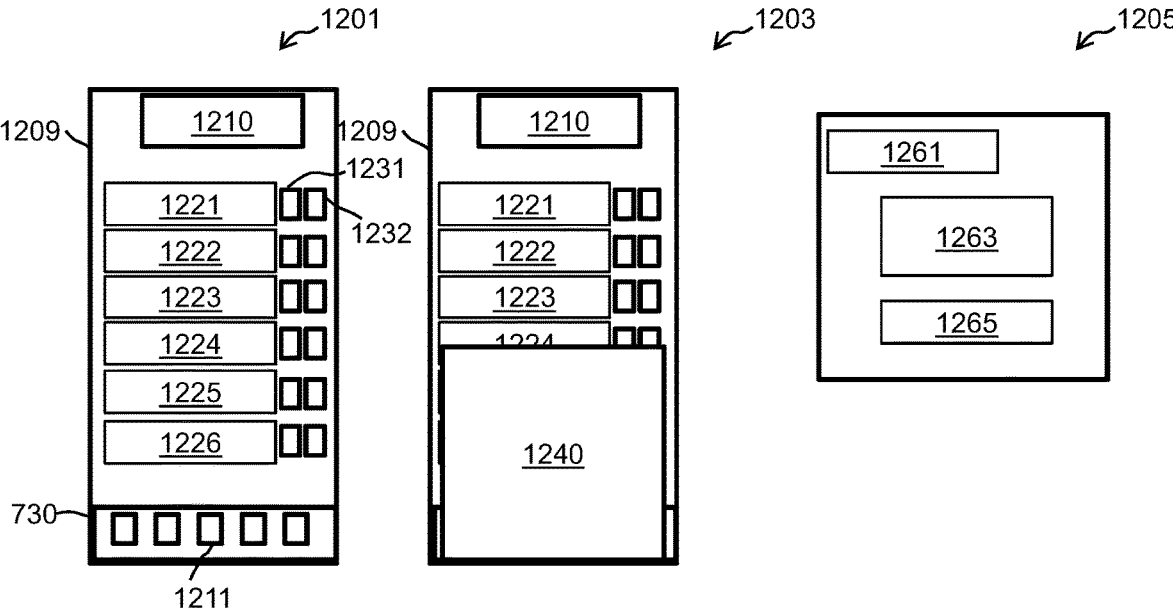
FIG. 12 depicts interfaces according to one or more embodiments.

At block 480, the engine 101 enables followers and following with the architecture 101. According to one or more embodiments, the independent, anonymous, and secure management by the engines 101 and 101A includes assigning one of a plurality of user categories to other digital identities to control access the digital information and services. The plurality of user categories include an owner, host, co-host, a member, and a guest. Each of the owners, hosts, co-hosts, members and the guests can follow posts as authorized by the use assigning the categories. In some cases, an original digital information creator can assign ownership over to another DID. FIG. 12 depicts interfaces 1201, 1203, and 1205 (e.g., UIs) according to one or more embodiments.

The interface 1201 includes a frame 1209 for presenting text, graphics, and other digital information and services of unassociated users who requested to be associated with the user of the device 104. The frame 1209 includes a title bar 1210 (e.g., 'People Queue' or "Pending Requests") that can present a name or other identifying elements of frame content. By way of example, the interface 1201 presents list of users 1221, 1222, 1223, 1224, 1225, and 1226, each of which has a corresponding accept icon 1231 or deny icon 1232. The user users 1221, 1222, 1223, 1224, 1225, and 1226 are selectable to cause a pop-up subframe 1240 to be generated. The pop-up subframe 1240 is further shown as the interface 1205. The interface 1205 presents a user name 1261, user details 1262, and a selectable icon 1263 that enables further review of that particular user. The options of the interfaces 1201, 1203, and 1205 are action examples of how the engines 101 and 101A maintain the sovereignty (i.e., absolute sovereignty) over the digital information and services and provide private and autonomous social media activity.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. A computer readable medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire Examples of computer-readable media include electrical signals (transmitted over wired or wireless connections) and computer-readable storage media. Examples of computer-readable storage media include, but are not limited to, a register, cache memory, semiconductor memory devices, magnetic media such as internal hard disks and removable disks, magneto-optical media, optical media such as compact disks (CD) and digital versatile disks (DVDs), a random access memory (RAM), a read-only memory (ROM), an erasable programmable read-only memory (EPROM or Flash memory), a static random access memory (SRAM), and a memory stick. A processor in association with software may be used to implement a radio frequency transceiver for use in a terminal, base station, or any host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method implemented by an engine to provide private and autonomous control of digital information and services of a user, the engine executed by at least one processor within a decentralized platform, the method comprises:

generating, by the engine implemented through multiple different instances locating on different nodes within the decentralized platform and communicating therebetween, a cryptographically secure and reusable distributed identity for the user, wherein a discrete individualized social network is provided on each of the different nodes based on a distributed identity basis;

storing, by the engine, the digital information and services on behalf of the user within the decentralized platform; and enabling, by the engine, independent, anonymous, and secure management of the digital information and services via the cryptographically secure and reusable distributed identity by obfuscating an identity of a server to support private and autonomous social media activity within the decentralized platform, wherein the independent, anonymous, and secure management by the engine provides direct and private control to the user over the digital information and services, and wherein the independent, anonymous, and secure management by the engine comprises assigning one of a plurality of user categories to other digital identities to control access the digital information and services.

2. The method of claim 1, wherein the digital information and services comprises one or more secure, private, personal data and computing provisions of the decentralized platform with respect to the user to enable the direct and private control over the digital information and services.

3. The method of claim 2, wherein the direct and private control comprises a sovereignty over the digital information and services to an exclusion of one or more of the other digital identities or to an exclusion of one or more third-parties.

4. The method of claim 1, wherein the cryptographically secure and reusable distributed identity comprising at least a distributed identity associated with a blockchain.

5. The method of claim 1, wherein the cryptographically secure and reusable distributed identity comprising public-private key combination.

6. The method of claim 1, wherein the plurality of user categories comprise an owner, a member, and a guest.

7. The method of claim 1, wherein the engine generates a feed for the cryptographically secure and reusable distributed identity providing the digital information and services.

8. The method of claim 1, wherein the cryptographically secure and reusable distributed identity obfuscates an identity of the user to support private and autonomous social media activity within the decentralized platform.

9. The method of claim 1, wherein the different nodes within the decentralized platform implement local data retention.

10. The method of claim 1, wherein the engine is virtualized in one or more cloud computing providers.

11. The method of claim 1, wherein the engine generates a seed for the cryptographically secure and reusable distributed identity, encrypts the seed with a password, and stores the encrypted seed in local storage on the different nodes.

12. The method of claim 1, wherein the multiple different instances of the engine comprise a server instance on a private server, a mobile instance on a mobile device, and a service instance on a network, and wherein the server instance, the mobile instance, and the service instance act together to create and provide the discrete individualized social network.

13. A decentralized platform comprising:

at least one processor; and an engine configured to provide private and autonomous control of digital information and services of a user, the engine implemented through multiple different instances locating on different nodes within the decentralized platform and communicating therebetween, being executed by the at least one processor to:

generate a cryptographically secure and reusable distributed identity for the user, wherein a discrete individualized social network is provided on each of the different nodes based on a distributed identity basis;

store the digital information and services on behalf of the user within the decentralized platform; and enable independent, anonymous, and secure management of the digital information and services via the cryptographically secure and reusable distributed identity by obfuscating an identity of a server to support private and autonomous social media activity within the decentralized platform, wherein the independent, anonymous, and secure management by the engine provides direct and private control to the user over the digital information and services, and wherein the independent, anonymous, and secure management by the engine comprises assigning one of a plurality of user categories to other digital identities to control access the digital information and services.

14. The decentralized platform of claim 13, wherein the digital information and services comprises one or more secure, private, personal data and computing provisions of the decentralized platform with respect to the user to enable the direct and private control over the digital information and services.

15. The decentralized platform of claim 14, wherein the direct and private control comprises a sovereignty over the digital information and services to an exclusion of one or more of the other digital identities or to an exclusion of one or more third-parties.

16. The decentralized platform of claim 13, wherein the cryptographically secure and reusable distributed identity comprising at least a distributed identity associated with a blockchain.

17. The decentralized platform of claim 13, wherein the cryptographically secure and reusable distributed identity comprising public-private key combination.

18. The decentralized platform of claim 13, wherein the plurality of user categories comprise an owner, a member, and a guest.

19. The decentralized platform of claim 13, wherein the engine generates a feed for the cryptographically secure and reusable distributed identity providing the digital information and services.

20. The decentralized platform of claim 13, wherein the cryptographically secure and reusable distributed identity obfuscates an identity of the user to support private and autonomous social media activity within the decentralized platform.

* * * * *